Oct. 10, 1967 G. ROSCHER ETAL 3,346,627
PREPARATION OF VINYL ESTERS FROM ACETYLENE IN
THE PRESENCE OF A MIXED ZINC SALT CATALYST
Filed April 1, 1965
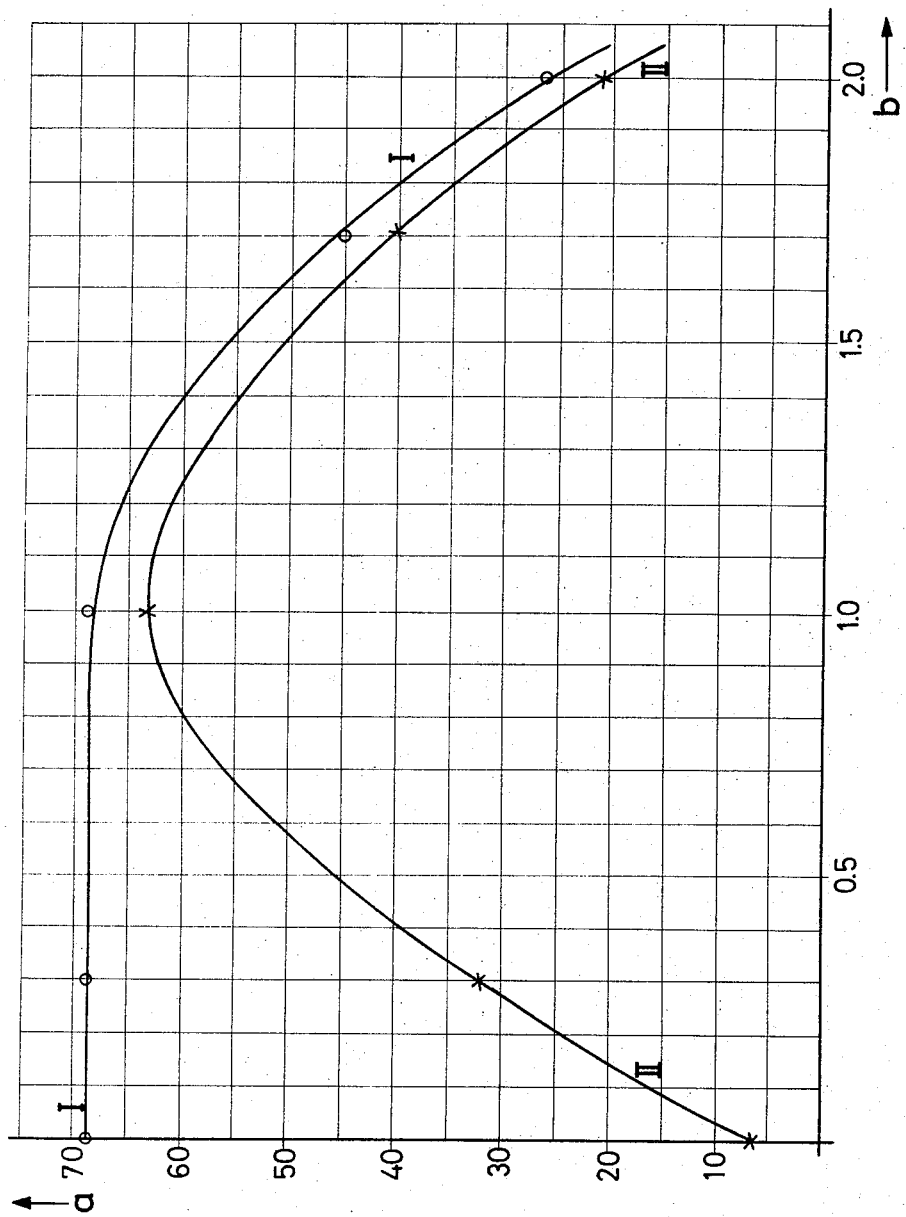
INVENTORS
GÜNTHER ROSCHER
WILHELM RIEMENSCHNEIDER
BY *Curtis, Morris & Safford*
ATTORNEYS United States Patent Office 3,346,627
Patented Oct. 10, 1967

3,346,627
PREPARATION OF VINYL ESTERS FROM ACETYLENE IN THE PRESENCE OF A MIXED ZINC SALT CATALYST
Günther Roscher, Kelkheim, Taunus, and Wilhelm Riemenschneider, Frankfurt am Main, Germany, assignors to Farbwerke Hoechst Aktiengesellschaft vormals Meister Lucius & Bruning, Frankfurt am Main, Germany, a corporation of Germany
Filed Apr. 1, 1965, Ser. No. 444,757
Claims priority, application Germany, Apr. 18, 1964, F 42,648
2 Claims. (Cl. 260—498)

The present invention relates to a process for preparing carboxylic acid vinyl esters by reacting carboxylic acids with acetylene in gaseous phase in the presence of catalysts.

It has been known for quite a while that vinyl esters, for example vinyl acetate, can be prepared from acetic acid and acetylene. The processes described in literature and used in industry are carried out, for example when vinyl acetate is to be prepared, in a manner such that vaporous acetic acid and acetylene are conducted over catalysts consisting of zinc acetate applied to active carbon as carrier material. The degree of conversion of acetic acid to vinyl acetate is dependent on the adjusted reaction temperature; a gradually decreasing conversion is compensated by a corresponding increase in the temperature.

The industrial process is performed at a temperature in the range of from about 160 to 220° C. with a conversion of about 60% of the acetic acid used. It has been found that when the process is conducted for a prolonged period of time, especially at a temperature of about or above 200° C., the conversion decreases, which may partially be attributed to sublimation of the catalytically active zinc acetate. This disadvantage is especially striking when, instead of acetic acid, carboxylic acids of higher molecular weight are to be vinylated. The smaller conversions are due to the fact that the catalytically active zinc salts of the higher carboxylic acids are more volatile than the zinc salt of acetic acid. Moreover, when carboxylic acids of higher molecular weight are to be vinylated, the reaction must be carried out at a temperature above the vinylation temperature of acetic acid. In order to avoid these disadvantages, catalysts have been used which are impregnated with the zinc salts of an aliphatic dicarboxylic acid. However, this process has the drawback that the dicarboxylic acids are slowly transformed into volatile vinyl esters which contaminate the desired vinyl ester and that after a prolonged period of time the catalyst consists again of zinc acetate.

It has now been found that the aforesaid disadvantages can be avoided and carboxylic acid vinyl esters can be prepared by reacting carboxylic acids with acetylene in the gaseous phase on catalysts consisting of zinc salts on carrier materials, when the zinc salts contain the radicals of sparingly volatile mineral acids which are free from acid hydrogen atoms, in addition to the radical of the carboxylic acid to be vinylated.

In the most simple case a zinc salt is used as catalyst in which one valency of the zinc is saturated by the radical of a sparingly volatile mineral acid while the other valency is saturated by the carboxylic acid. In this case a mixed zinc salt is concerned, i.e. a zinc salt in which the zinc atom is bound to the radicals of two different acids. If a polybasic, sparingly volatile mineral acid is used for salt formation, as set forth below, the radical of the mineral acid forming the salt shall be free from acid hydrogen atoms. The remaining free valencies of the zinc atoms are then allotted to acid radicals of the carboxylic acid to be vinylated. In this case salts can be obtained which have more than one zinc atom in the molecule and in which the average statistic ratio between carboxylic acid radicals and mineral acid radicals may differ from 1. It is even possible to use one of the specified zinc salts according to the invention in admixture with the pure zinc salt of the mineral acid. The conversions obtained with salt mixtures of this type are, of course, not as high as those obtained with zinc salts according to the invention, however, the conversions obtained with the said salt mixtures are considerably higher than the conversions attained with the use of the pure zinc salts of mineral acids.

Consequently, the ratio of the mineral acid equivalents to carboxylic acid equivalents allotted to the zinc atom may vary within wide limits. It is advantageously in the range of from 0.15 to 6.0 and more advantageously 0.7 to 1.3). In any case the proportion of mineral acid in the specified salts is smaller than the proportion of mineral acid in the corresponding pure, stoichiometric zinc salts of the mineral acid.

As radicals of sparingly volatile mineral acids in the zinc salts to be used as catalysts according to the invention there may be mentioned the radicals of phosphoric acids such as ortho-, pyro- and meta-phosphoric acid, and possibly of higher phosphoric acids, and of sulfuric acids. The sulfate radical and particularly the ortho-phosphate radical are preferred. As radicals of carboxylic acids there enter into consideration the radicals of the carboxylic acids to be vinylated, as mentioned below.

The zinc salts according to the invention are applied to carriers. Suitable carriers are those which are known from the manufacture of vinyl acetate, among which active carbon has proved to be especially suitable. The most effective concentration of the catalyst on the carrier material depends on the surface of the carrier and on the nature of the catalyst. In many cases it is advantageous to operate with a content of 6 to 15% of zinc, calculated on the weight of the system consisting of catalyst and carrier material.

The catalyst can be prepared according to various methods. The carrier material can be impregnated with the aqueous solution of the zinc salt of the carboxylic acid to be vinylated. Depending on the concentration of the solution and the adsorption equilibrium obtained, a definite amount of zinc salt is absorbed by the carrier material. The catalyst mixture is then dried and impregnated with the desired amount of mineral acid, for example ortho-phosphoric acid or sulfuric acid, which replaces the equivalent amount of carboxylic acid in the zinc salt. Another method of preparing the catalyst consists in applying the basic zinc salt of the mineral acid, for example ortho-phosphoric acid, to the carrier material at the beginning of the reaction. After a certain starting time the basic groups of the zinc salt are replaced by the radicals of the carboxylic acid to be vinylated.

A catalyst for preparing vinyl esters of carboxylic acids of high molecular weight can be obtained by first impregnating the carrier material with zinc acetate and the desired amount of mineral acid and using the catalyst in the reaction. After a certain starting period the acetate radical is replaced by the radical of the higher carboxylic acid to be vinylated. Instead of zinc acetate a mixed salt, for example zinc acetate phosphate can be applied to the carrier material. In this case, too, the acetate radical is replaced by the radical of the higher boiling carboxylic acid.

The reaction is suitably carried out in a manner such that acetylene and the vaporous carboxylic acid are conducted over the catalyst fixed in the reaction zone. The molar ratio of acetylene to carboxylic acid may vary within wide limits. When the process is carried out on an industrial scale, the ratio applied ranges in general from 2:1 to 20:1.

The reaction is performed in the usual manner at a temperature in the range of from about 150 to 300° C., preferably 160 to 260° C., and at atmospheric pressure. It is likewise possible, however, to operate under diminished pressure, for example when vinyl esters of sparingly volatile carboxylic acids are to be produced. Still further, the reaction may be carried out under slightly elevated pressure, provided that the precautions established for the handling of acetylene under pressure are observed.

The process according to the invention can be used for vinylating all carboxylic acids that have a perceptible vapor pressure under the reaction conditions, for example alkane- and alkene-monocarboxylic acids with up to 10 carbon atoms, such as acetic acid, propionic acid, butyric acid, isobutyric acid, valeric acid, caproic acid, caprylic acid, acrylic acid, and the like. It is likewise possible to vinylate carboxylic acids prepared by reacting α-olefins with carbon monoxide and water in the presence of acids, i.e. carboxylic acids having a branched chain with up to 12 carbon atoms, for example pivalic acid and 2,2,4,4-tetramethylvaleric acid. Cycloaliphatic and aromatic carboxylic acids, for example cyclohexanoic acid, benzoic acid and benzoic acids carrying low molecular weight alkyl radicals, for example the various tolyl acids, can likewise be vinylated according to the process of the invention. Moreover, the semi-esters of aliphatic dicarboxylic acids with low molecular weight alkanols, for example maleic acid monomethyl ester, and dicarboxylic acids, for example glutaric acid and phthalic acid, are suitable. The carboxylic acids to be reacted may carry substituents that are inert under the reaction conditions. There may be mentioned fluorinated and chlorinated carboxylic acids such as fluoroacetic acid, chloroacetic acid, monofluorodichloroacetic acid, trifluoroacetic acid, or α-chlorobutyric acid. Aromatic carboxylic acids may, of course, also carry reaction-inert substituents on the aromatic nucleus, for example chlorine atoms, methoxy groups or nitro groups.

The vinyl esters can be separated from the mixture of the reaction gases by condensation and/or washing out and obtained in pure form by distillation.

Experiments using zinc salts as catalysts in which both valencies of the zinc atom were saturated by nonvolatile mineral acids, for example $Zn_3(PO_4)_2$ or $ZnSO_4$, only yielded very small conversions. It was, therefore, surprising that the mixed salts to be used according to the invention gave the same conversions as the pure zinc salts of carboxylic acids at the beginning of the reaction. The mixed salts according to the invention do not have the considerable drawback of the pure carboxylic acid zinc salts of being volatile under the reaction conditions, which involves a rapid reduction of the activity of the known catalyst. The mixed zinc salts to be used according to the invention have a substantially longer life than the pure zinc salts hitherto used. This is especially favorable in the preparation of vinyl esters of carboxylic acids of high molecular weight which must be carried out at relatively high temperatures. An economical preparation of these vinyl esters becomes only possible by the use of the mixed zinc salts according to the invention.

The following examples serve to illustrate the invention but they are not intended to limit it thereto, the percentages are mol percent unless otherwise stated.

*Example 1*

The reaction was carried out in two equal reaction tubes connected in parallel each having a diameter of 2.5 centimeters and a length of 1.20 meters. Each reaction tube was connected in series with an evaporator for the organic carboxylic acid to be reacted. The evaporators as well as the reaction tubes were placed in a vessel filled with a heat transfer oil. The oil was heated to the reaction temperature by electrical heating and circulated by means of a pump.

600 milliliters of a known catalyst consisting of zinc acetate on active carbon were introduced into reaction tube 1. The catalyst had a zinc content of 11%, calculated on the dried catalyst. Another portion of the same catalyst was carefully dried at 140° C. 650 grams of the dried catalyst were impregnated with a solution of 45 grams of 85% phosphoric acid in 400 milliliters of water. The amount of water was chosen so that the solution was completely absorbed by the catalyst. The amount of phosphoric acid used corresponded approximately to the amount required for saturation of one half of the valencies of zinc. 600 milliliters of the catalyst thus obtained were filled into reaction tube 2.

Both reaction tubes were heated at 186° C. in a nitrogen current and into each tube 51 grams/hour of acetic acid and 110 liters/hour of acetylene were introduced. The reaction mixtures leaving the tubes were conducted, separately from one another, through series-connected cooling systems, the first one being filled with a cooling brine and the second one with a mixture of acetone and Dry Ice. In the cooling systems the liquid reactants were separated from the gaseous reactants. In both reactors about 71% of acetic acid was converted to vinyl acetate. After a running time of 2040 hours under identical conditions the conversion of acetic acid in reaction tube 1 had dropped to 37%, while in tube 2 filled with the catalyst according to the invention the conversion still amounted to 60%.

*Example 2*

The equipment used was the same as in Example 1. Reactor 1 was filled with 600 milliliters of a known catalyst containing 11.7% of zinc in the form of zinc propionate on active carbon. Another portion of the same catalyst was dried and 1000 grams of the dried catalyst were impregnated with a solution of 69 grams of about 85% phosphoric acid in 500 milliliters of water as indicated in Example 1. 600 milliliters of the catalyst thus obtained were filled into reactor 2. 110 liters/hour of acetylene and 63 grams/hour of propionic acid were metered into each reactor. At a temperature of 191° C. in both reactors about 61% of the propionic acid used was converted at the beginning of the reaction. After about 300 hours the unheated outlet of reactor 1 was clogged by deposited sublimates. After removal of the sublimates the reaction was continued. After 700 hours the conversion of propionic acid to vinyl propionate in reactor 1 had dropped to 43%, while in reactor 2, containing the catalyst according to the invention, 56% of propionic acid was still converted.

*Example 3*

Vinyl isobutyrate was prepared from acetylene and isobutyric acid in the apparatus described in Example 1. The following catalysts (a) to (f) were used:

(a) zinc isobutyrate on active carbon, corresponding to a bulk volume of about 600 milliliters and having a zinc content of 11.3% by weight, calculated on the dried catalyst;

(b) 210 grams of the same but carefully dried catalyst according to (a) corresponding to a bulk volume of about 600 milliliters, impregnated with a solution of 5 grams of 85% phosphoric acid in 100 milliliters of water;

(c) 210 grams of the dried catalyst according to (a) impregnated with 14 grams of 85% phosphoric acid in 125 milliliters of water;

(d) 210 grams of the dried catalyst according to (a) impregnated with 24 grams of 85% phosphoric acid in 125 milliliters of water;

(e) 210 grams of the dried catalyst according to (a) impregnated with 28.5 grams of 85% phosphoric acid in 125 milliliters of water;

(f) tertiary zinc ortho-phosphate supported on active carbon, in an amount corresponding to a bulk volume of 600 milliliters and a zinc content of 11.0% by weight, calculated on the dried catalyst.

Catalysts (a) to (f) were tested in the apparatus under identical conditions, i.e. at a reaction temperature of 207° C. and with a supply of 110 liters/hour of acetylene and 75 grams/hour of isobutyric acid.

With the catalyst described sub (a) 69% of the isobutyric acid was converted at the beginning of the reaction to vinyl isobutyrate. After about 6–8 hours clogging was observed at the reactor outlet by deposited sublimates of zinc isobutyrate. The sublimates were removed and the reaction was continued. After the same period of time, clogging occurred again. In the course of 600 hours, in which the intervals between clogging by the sublimate deposits became longer and longer, the conversion of isobutyric acid dropped to 8%.

With the catalyst described sub (b) 69% of the isobutyric acid used was converted to vinyl isobutyrate at the beginning of the reaction. After a period of reaction of 600 hours, during which deposited sublimate must be removed several times, the conversion to vinyl isobutyrate had dropped to 32%.

With the catalyst specified sub (c) 69% of the isobutyric acid used was converted to vinyl isobutyrate at the beginning of the reaction. After 600 hours, during which no interruption occurred by sublimates, the conversion of isobutyric acid to vinyl isobutyrate still amounted to 64%.

With the catalyst specified sub (d) 45% of the isobutyric acid used was converted at the beginning of the reaction. After a period of reaction of 600 hours without any deposit of sublimate the conversion still amounted to 40%.

With the catalyst defined sub (e) 26% of the isobutyric acid used was converted to vinyl isobutyrate at the beginning of the reaction. After a period of reaction of 600 hours without any formation of sublimate occurring, the conversion amounted to 21%.

With the catalyst described in sub (f) the conversion of isobutyric acid obtained at the beginning of the reaction was 23%. After a period of reaction of 600 hours without the formation of sublimate occurring the conversion still amounted to 19%.

The results are compared in the following table:

TABLE

| Catalyst | Proportion of used amount of o-phosphoric acid, calculated on zinc valencies present | Ratio of isobutyrate radicals: o-phosphate radicals, calculated on acid equivalents | Conversion of isobutyric acid | |
|---|---|---|---|---|
| | | | At beginning of reaction, percent | After 600 hours of reaction, percent |
| (a) | 0 | | 69 | 8 |
| (b) | 0.3 | 5.7 | 69 | 32 |
| (c) | 1 | 1 | 69 | 64 |
| (d) | 1.7 | 0.18 | 45 | 40 |
| (e) | 2 | | 26 | 21 |
| (f) | 2 | | 23 | 19 |

In the accompanying diagram on the abscissa *a* is plotted the proportion of the two zinc valencies saturated by phosphoric acid, while on the ordinate *b* is plotted the conversion of isobutyric acid to vinyl isobutyrate in percent. Curve I indicates the conversion at the beginning of the reaction whereas curve II shows the conversion after a period of reaction of 600 hours.

*Example 4*

89 grams of zinc isobutyrate and a solution of 14.2 grams of 85% ortho-phosphoric acid in 60 milliliters of water were evaporated to dryness while stirring. The residue was heated to 200° C. under a slight vacuum of a water jet pump until isobutyric acid no longer escaped. The finely pulverized residue was suspended in 200 milliliters of boiling water, 180 grams of active carbon were added and the mixture was evaporated to dryness while stirring. The carbon, on which practically the total amount of zinc isobutyrate-phosphate had been precipitated, was filled into reactor 1. Reactor 2 was filled with 600 milliliters of a catalyst containing 10.8% of zinc in the form of basic zinc phosphate. 75 grams/hour of isobutyric acid and 110 liters/hour of acetylene were introduced into each of the reactors. At a temperature of 208° C. the conversion of isobutyric acid to vinyl isobutyrate was 67% in reactor 1. After a period of reaction of 600 hours without any interruption the conversion still amounted to 60%. In reactor 2 41% of the acid was converted at the beginning of the reaction and 37% after 600 hours.

*Example 5*

The equipment of Example 1 was used. Reactor 1 contained 600 milliliters of a known catalyst containing 10.9% of zinc in the form of zinc-n-butyrate on active carbon. 1000 grams of the carefully dried catalyst were impregnated with a solution of 64 grams of about 85% ortho-phosphoric acid in 550 milliliters of water. 600 milliliters of the catalyst thus obtained were filled into reactor 2. Each reactor was fed per hour with 75 grams of butyric acid and 110 liters of acetylene. At a temperature of 198° C. the initial conversion of butyric acid to vinyl n-butyrate amounted to 70% in both reactors. After 2 days the first obstructions by sublimates of zinc n-butyrate were observed in reactor 1. The sublimates were removed mechanically and the reaction was continued. The same troubles were encountered at longer and longer intervals. After 630 hours the conversion in reactor 1 had dropped to 17%. In reactor 2, in which the reaction proceeded without any trouble, the conversion still amounted to 64% after 630 hours.

When the reaction was carried out under the same conditions with the exception that in reactor 2 a catalyst was used which had been prepared with sulfuric acid in an amount equivalent to 64 grams of 85% ortho-phosphoric acid, the conversion at the beginning of the reaction amounted to 67% and after 630 hours to 60%.

We claim:

1. In a process for preparing the vinyl ester of a monocarboxylic acid by contacting the acid and acetylene in the gaseous phase with a zinc salt catalyst on a carrier, the improvement wherein said zinc salt is a mixed salt of a hydrocarbon monocarboxylic acid having up to 12 carbon atoms and of a mineral acid selected from the group consisting of phosphoric acid and sulfuric acid, the ratio of equivalents of mineral acid to equivalents of monocarboxylic acid in said mixed salt being from 0.15 to 6.0.

2. A process as in claim 1 wherein said monocarboxylic acid is a lower alkanoic acid.

References Cited

UNITED STATES PATENTS 1,666,482  4/1928  Baum et al. _____ 260—498
2,770,650  11/1956  Stanton _____ 260—498

RICHARD K. JACKSON, *Primary Examiner.*

LORRAINE A. WEINBERGER, *Examiner.*

V. GARNER, *Assistant Examiner.*